(12) United States Patent
Motta et al.

(10) Patent No.: US 7,604,442 B2
(45) Date of Patent: Oct. 20, 2009

(54) MULTI-AXIS MACHINE TOOL

(75) Inventors: Stefano Motta, Turin (IT); Piergiacomo Bongiorni, Piacenza (IT)

(73) Assignee: JOBS S.p.A., Bologna (IT)

( * ) Notice: Subject to any disclaimer, the term of this patent is extended or adjusted under 35 U.S.C. 154(b) by 396 days.

(21) Appl. No.: 11/665,917

(22) PCT Filed: Oct. 13, 2005

(86) PCT No.: PCT/IB2005/003216

§ 371 (c)(1),
(2), (4) Date: Apr. 20, 2007

(87) PCT Pub. No.: WO2006/043173

PCT Pub. Date: Apr. 27, 2006

(65) Prior Publication Data

US 2009/0067944 A1    Mar. 12, 2009

(30) Foreign Application Priority Data

Oct. 22, 2004  (IT)  .......................... BO2004A0657

(51) Int. Cl.
*B23C 1/06* (2006.01)
*B23C 1/12* (2006.01)
*B23Q 5/28* (2006.01)
*B23Q 1/00* (2006.01)

(52) U.S. Cl. ........................ 409/212; 409/235; 409/238; 409/211; 310/12

(58) Field of Classification Search ................. 409/202, 409/212, 235, 201, 211, 216, 238, 239, 135, 409/136; 408/234, 236, 237; 310/12, 15–17; 82/149, 900; 451/340, 342, 360, 361, 363
See application file for complete search history.

(56) References Cited

U.S. PATENT DOCUMENTS

| | | | |
|---|---|---|---|
| 3,780,619 A * | 12/1973 | Kitamura et al. | 409/202 |
| 7,198,438 B2 * | 4/2007 | Kosmowski | 409/235 |
| 7,261,503 B2 * | 8/2007 | Motta et al. | 409/235 |
| 2002/0131836 A1 * | 9/2002 | Ferrari et al. | 409/212 |
| 2003/0077139 A1 * | 4/2003 | Chang et al. | 409/235 |
| 2004/0104694 A1 * | 6/2004 | Nakamoto et al. | 318/135 |
| 2006/0159540 A1 * | 7/2006 | Motta et al. | 409/235 |
| 2006/0193707 A1 * | 8/2006 | Nakajima et al. | 409/235 |

FOREIGN PATENT DOCUMENTS

| | | |
|---|---|---|
| DE | 101 51 631 A1 | 5/2003 |
| EP | 1 228 838 A | 8/2002 |
| WO | WO-2004/067221 A1 * | 8/2004 |

* cited by examiner

*Primary Examiner*—Erica E Cadugan
(74) *Attorney, Agent, or Firm*—Timothy J. Klima; Shuttleworth & Ingersoll, PLC

(57) ABSTRACT

In a multi-axis machine tool comprising a first slide way (2a) and a second slide way (2b) set apart one from the other and extending parallel along a longitudinal axis (X), a machining station (3) delimited laterally by the slide ways (2a, 2b), a cross member (4) presenting opposite ends (4a, 4b) each coupled to a respective slide way (2a, 2b), and a machining head (5) mounted to the cross member (4) and positionable over the machining station (3), at least the cross member (4) is fashioned from a low thermal expansion material.

25 Claims, 2 Drawing Sheets

MULTI-AXIS MACHINE TOOL

This application is the national phase of international application PCT/ IB2005/003216 filed Oct. 13, 2005 which designated the U.S. and that international application was published under PCT Article 21 (2) in English. This application claims priority to Italy Patent application No. BO2004A 000657, filed Oct. 22, 2004, which is incorporated by reference herein.

TECHNICAL FIELD

The present invention relates to a multi-axis machine tool with features identifiable as in the preamble of claim 1.

In particular, the present invention is applicable to the art field of numerically controlled multi-axis machine tools used for high speed milling operations.

BACKGROUND ART

The machine tools to which the invention relates are utilized particularly in the aircraft building industry for contouring and drilling parts made of aluminium and composite materials, and in the automobile sector for producing master models, and models for bodywork, internal parts and dies.

Numerically controlled multi-axis machine tools of the conventional type in question are furnished with two longitudinal slide ways supporting a gantry or cross member capable of movement along a path parallel to the longitudinal axis of the slide ways. The slide ways are spaced apart in such a manner as to delimit a machining station between them, in which the work is positioned. The two opposite ends of the cross member rest on the two longitudinal guide ways. The cross member is traversable over the machining station and carries a machining head such as will clamp and drive a tool selected for the required drilling or milling operation.

As a general rule the machining head is traversable along the cross member in a direction normal to the direction of the motion induced in the cross member. Moreover, the head can be raised from and lowered toward the machining station and is rotatable about two axes, one vertical, the other horizontal, so that the tool can be angled relative to the workpiece. The work is placed in the machining station, and the machining head positioned on the cross member by the carriage in such a way as to address and machine the specified areas of the work. Positioning movements are induced by linear motors interposed between the various parts in relative motion and piloted by a programmable electronic controller.

Disadvantageously, machines of this familiar type present a structure made entirely of steel which, in the course of the various movements, absorbs the heat produced by the linear motors and by sliding friction. The exposure of parts to heat results in the deformation of these same parts. Deformation of the cross member is especially critical, since both ends of the cross member are coupled positively to the slide ways. In effect, as a result of the thermal expansion induced by heating and the restraining action of the couplings at each end, the cross member is caused to deflect and assume a bowed profile, impeded as it is, by the restraints, from elongating freely. The deformation affects the position of the machining head and jeopardizes the accuracy of machining operations.

The applicant finds that multi-axis machine tools of the prior art are improvable in a number of ways, and particularly as regards the dimensional stability of their structures in the face of temperature rises attributable to the various motors and to sliding friction.

The object of the present invention, accordingly, is to design a multi-axis machine tool substantially devoid of the above noted drawbacks.

In particular, it is an object of the invention to set forth a multi-axis machine tool in which machining accuracy is unaffected by the effects of heat on the machine.

DISCLOSURE OF THE INVENTION

The stated objects are realized, according to the present invention, in a multi-axis machine tool incorporating one or more of the technical solutions claimed hereinafter.

The invention will now be described in detail, by way of example, with the aid of the accompanying drawings, in which.

Figure 1:
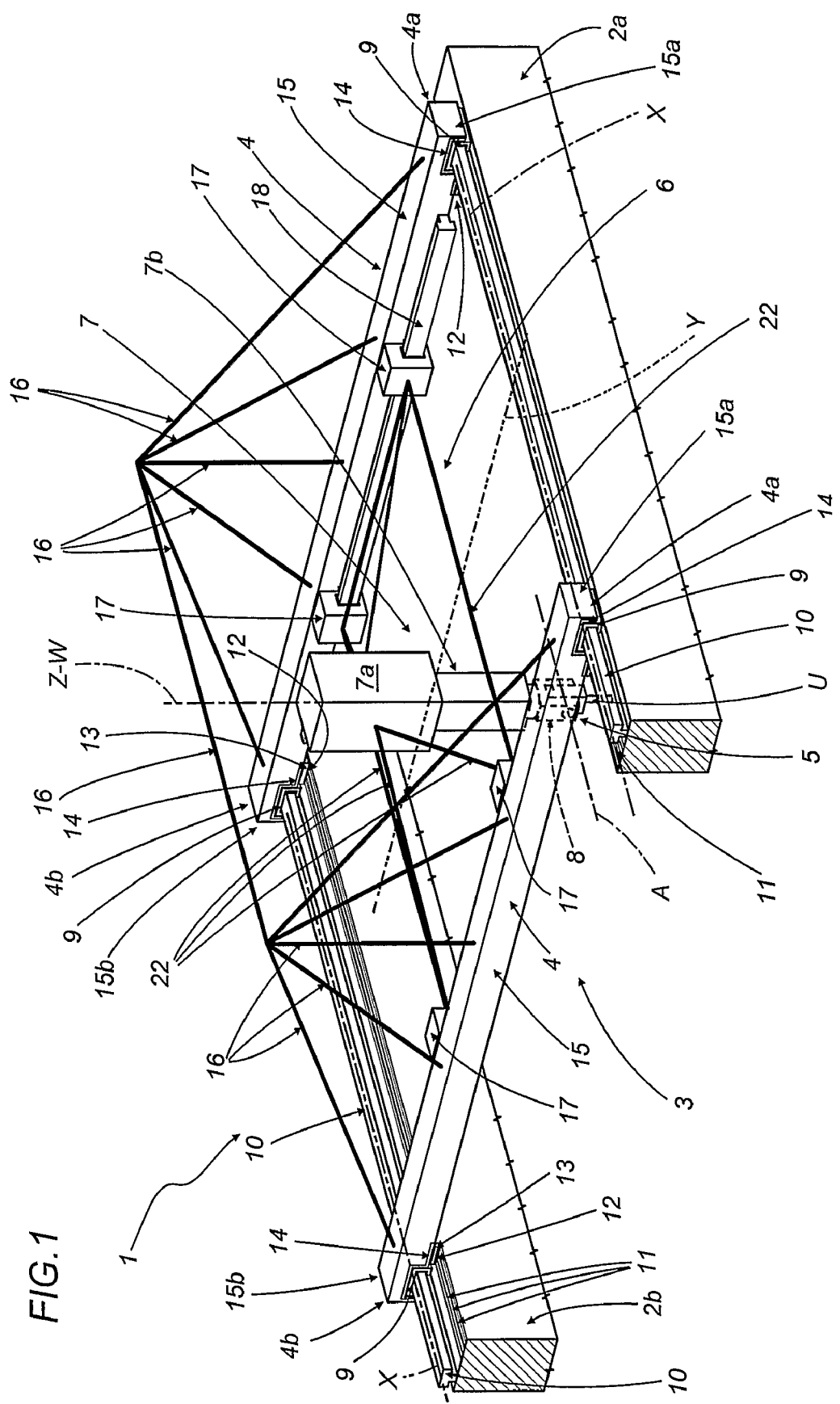
FIG. 1 shows a multi-axis machine tool in accordance with the present invention, viewed in perspective.

With reference to the accompanying drawings, numeral 1 denotes a multi-axis machine tool, in its entirety.

The multi-axis machine tool 1 comprises a first slide way 2a and a second slide way 2b, set apart one from the other and extending parallel along a longitudinal axis X that defines a first direction of movement. The space delimited laterally by the slide ways 2a and 2b functions as a machining station 3. The slide ways 2a and 2b support a cross member 4 of which the two opposite ends 4a and 4b are each associated slidably with a respective way 2a and 2b. Also forming part of the machine tool 1 is a machining head 5 mounted to the cross member 4 and capable of motion above the machining station 3. To this end, the machine tool 1 further comprises a carriage 6 traversable along the cross member 4 in a second direction of movement Y. A first supporting body 7 mounted to the carriage 6 is capable of vertical motion, relative to the carriage 6, along a third direction of movement Z. A second supporting body 8 associated with a bottom portion of the first supporting body 7 is rotatable relative to the first body 7 about a first vertical axis W parallel to or coinciding with the third direction of movement Z. The machining head 5 is anchored pivotably to the second supporting body 8, with freedom of angular motion about a second horizontal axis A, and consists in a spindle to which a tool U such as a drill bit or milling cutter can be clamped. The head 5 is thus capable of movement along and/or about five distinct axes X, Y, Z, W and A in such a way that it can be positioned freely at any given point within the work envelope of the machining station 3, assuming any given angle relative to the selfsame station 3 and to the workpiece.

To advantage, and in contrast to machines typical of the prior art, at least the cross member 4 is made of a low thermal expansion material (LTEM). In the context of the present specification and the appended claims, a low thermal expansion material would be one having a coefficient of linear thermal expansion (CLTE) much lower than that of steel, which is in the region of $11*10^{-6\circ}$ C.$^{-1}$. Advantageously, the material employed will have a CLTE of less than $3*10^{-6\circ}$ C.$^{-1}$, possibly between $-1*10^{-6\circ}$ C. and $1*10^{-6\circ}$ C.$^{-1}$, and preferably between $-0.5*10^{-6\circ}$ C.$^{-1}$ and $0.5*10^{-6\circ}$ C.$^{-1}$.

Likewise advantageously, the low thermal expansion material in question will be a composite containing carbon fibre. In particular, carbon fibre typically has negative coefficients of linear thermal expansion ranging between $-1*10^{-6\circ}$ C.$^{-1}$ and $-0.3*10^{-6\circ}$ C.$^{-1}$. The structure of carbon fibre composite is such that coefficients of linear thermal expansion CLTE, whether positive or negative, will in any event be close to zero.

Alternatively, the low thermal expansion material could be a ceramic material or a composite of silicon carbide and its derivatives, albeit no limitation is implied.

Figure 2:
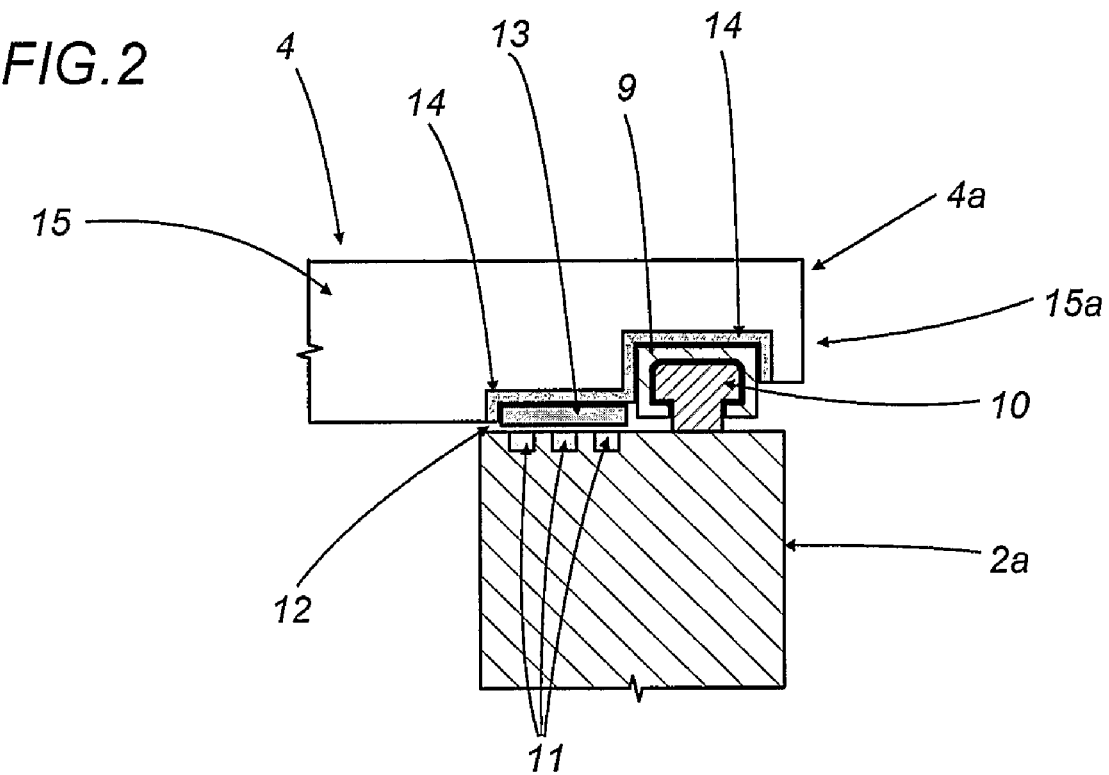
FIG. 2 shows a first detail of the machine tool in FIG. 1, viewed in section.

To enable the cross member 4 to slide along the ways 2a and 2b, each of the aforementioned ends 4a and 4b is furnished with at least one shoe 9 coupled to a rail 10 mounted on the respective slide way 2a and 2b and extending along the first direction of movement X (FIG. 2).

Also associated with each slide way 2a and 2b, extending parallel to the rail 10, is the stator 11 of a first linear motor 12 interlocked to a control unit, not illustrated in the drawings, by which the cross member 4 is set in motion. The first linear motor 12 further comprises a magnet 13 incorporated into each end 4a and 4b of the cross member 4.

To advantage, given that the magnet 13 is metallic and therefore liable to expand thermally, a layer 14 of resilient material is interposed between the magnet 13 and the cross member 4, such as will absorb the thermal expansion of the metal. The material in question could be a film of adhesive or a resin, both of which familiar to a person skilled in the art.

Preferably, moreover, the shoes 9 and the rails 10 will also be metallic. Accordingly, a layer 14 of resilient material is interposed likewise between the shoe 4 and the cross member 4 in order to prevent internal stresses from being generated at the interface between these same components.

Advantageously, the cross member 4 presents a lattice type construction which in the example illustrated, preferred though implying no limitation, comprises a pair of parallel beams 15 fashioned from the aforementioned low thermal expansion material. Each member 15 presents a first end 15a equipped with a relative shoe 9, coupled slidably with the first way 2a, and a second end 15b equipped with a relative shoe 9, coupled slidably with the second way 2b. The beams 15 are also connected one to another by a plurality of struts 16 making up the lattice structure. In a preferred solution, these struts 16 likewise will be embodied in the aforementioned low thermal expansion material. The struts 16, beams 15 and slide ways 2a and 2b might be embodied in materials dissimilar one from another, provided that all are characterized by a low coefficient of linear thermal expansion.

The carriage 6 carrying the machining head 5 is mounted slidably to the cross member 4 and traversable along its length in the aforementioned second direction Y, normal to the first direction X. The carriage 6 presents at least one shoe 17 coupled to a respective rail 18 associated with the cross member 4 and extending in the second direction Y.

Also illustrated in the drawings is a second linear motor 19 located between the carriage 6 and the cross member 4 and piloted by the aforementioned electronic control unit, of which the function is to set the carriage 6 in motion along the cross member.

The second linear motor 19 comprises a stator 20 mounted to the cross member 4, extending parallel to the relative rail 18, and a magnet 21 mounted to the shoe 17 of the carriage 6.

Figure 3:
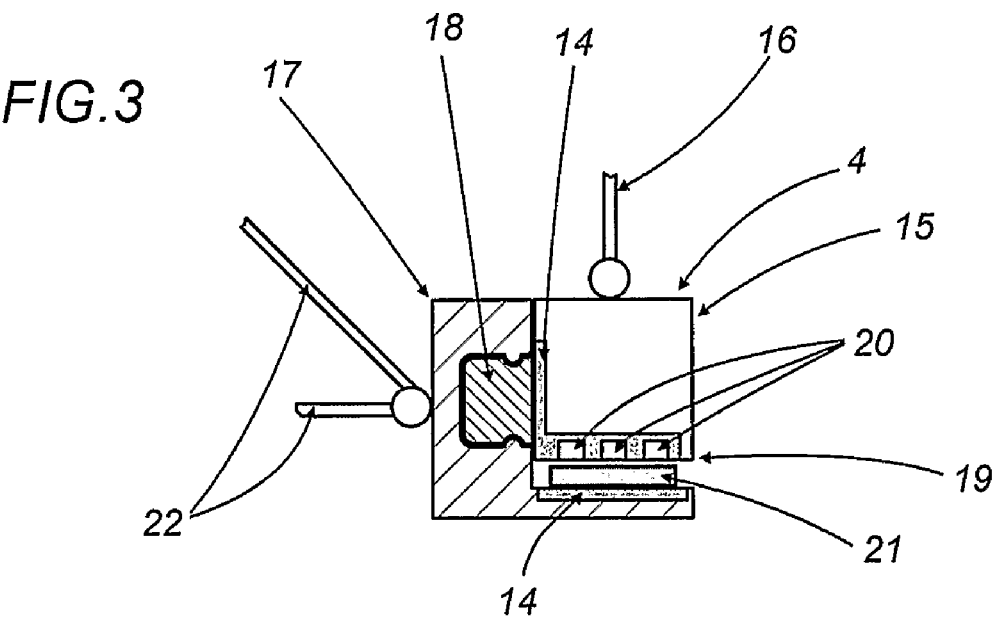
FIG. 3 shows a second detail of the machine tool in FIG. 1, viewed in section.

Entirely in like manner to the interface between the magnets 13 and the ends of the cross member 4, the stator 20 of the second linear motor 19 is associated with the low thermal expansion material of the cross member 4 by way of an interposed layer 14 of resilient material able to absorb the expansion of the stator 20 (FIG. 3). The material could be the same as that interposed between the cross member 4 and the magnet 13 of the first linear motor 12.

Again preferably, the shoes 17 of the carriage 6 and the rails 18 of the cross member 4 will be metallic, and accordingly, a layer 14 of resilient material is interposed likewise between the rail 18 and the cross member 4 in order to prevent internal stresses from being generated at the interface between these same components (FIG. 3).

In a preferred embodiment, the carriage 6 will also be embodied in a low thermal expansion material.

In the preferred embodiment illustrated, the carriage 6 presents a lattice structure connected to each beam 15 by way of two shoes 17, as discernible in FIG. 1. The lattice, fabricated for example from struts 22 of carbon fibre, carries the first supporting body 7. More particularly, the first supporting body 7 is divided into a top portion 7a rigidly associated with the carriage 6, and a bottom portion 7b slidable vertically relative to the top portion 7a along the third direction Z. In practice, the first supporting body 7 might also be embodied in the same low thermal expansion material as employed for the other components mentioned above.

The drawbacks mentioned at the outset are overcome with a machine tool according to the invention, and the stated objects duly realized.

First and foremost, the adoption of a low thermal expansion material for the construction of the cross member is instrumental in limiting elongation and thus avoiding deformation of the component beams. Accordingly, a machine tool according to the present invention guarantees greater precision in machining than is possible with machines of the prior art, and moreover, a precision unaffected by the temperatures registering in its component parts.

Adopting composite materials and lattice type frames, moreover, the weight of moving parts can be reduced in comparison with the prior art, and the power of electric motors can be trimmed without any loss of performance. The reduction of weights and of rated power also means that less thermal energy is generated directly by the linear electric motors, and by friction, and transferred to the cross member as heat during machining operations.

Finally, the adoption of lattice structures will make the components easier to dismantle and transport from the premises where the machine is built to the site where it is to be installed.

The invention claimed is:

1. A multi-axis machine tool comprising:
   a first slide way (2a) and a second slide way (2b) set apart one from the other and extending parallel along a longitudinal axis (X);
   a machining station (3) delimited laterally by the slide ways (2a, 2b);
   a cross member (4) presenting opposite ends (4a, 4b) each associated slidably with a respective slide way (2a, 2b);
   a machining head (5) mounted to the cross member (4) and positionable over the machining station (3);
   characterized in that the cross member (4), at least, is embodied in a low thermal expansion material (LTEM);
   wherein the cross member is slidably actuated by a linear motor including a magnet that is positioned adjacent a layer of resilient material able to absorb expansion of the magnet.

2. A machine tool as in claim 1, wherein the cross member (4) is equipped with at least two shoes (9) mounted one to each end (4a, 4b) and coupled each with a rail (10) presented by the respective slide way (2a, 2b).

3. A machine tool as in claim 2, wherein each shoe (9) is made of metallic material and interfaced with the low thermal expansion material of the cross member (4) by way of a layer (14) of resilient material able to absorb the expansion of the respective shoe (9).

4. A machine tool as in claim 2, wherein the linear motor (12) is composed of a stator (11) mounted to each slide way (2a, 2b), extending parallel to the respective rail (10), and a magnet (13), including the magnet adjacent the layer of resilient material, associated with each end of the cross member (4a,4b).

5. A machine tool as in claim 4, wherein each of the magnets (13) is interfaced with the low thermal expansion material of the cross member (4) by way of a layer (14) of the resilient material able to absorb the thermal expansion of the magnet (13).

6. A machine tool as in claim 1, wherein the cross member (4) comprises a lattice structure.

7. A machine tool as in claim 6, wherein the cross member (4) comprises a pair of parallel beams (15) embodied in low thermal expansion material, each
presenting a first end (15a) connected slidably to the first way (2a) and a second end (15b) connected slidably to the second way (2b).

8. A machine tool as in claim 7, wherein the beams (15) are interconnected by a plurality of struts (16) making up the lattice structure.

9. A machine tool as in claim 8, wherein the struts (16) are embodied in low thermal expansion material.

10. A machine tool as in claim 1, further comprising a carriage (6) mounted slidably to the cross member (4), wherein the machining head (5) is mounted to the carriage (6).

11. A machine tool as in claim 10, wherein the carriage (6) is equipped with at least one shoe (17) coupled with a rail (18) installed on the cross member (4).

12. A machine tool as in claim 11, wherein the rail (18) is made of metallic material and interfaced with the low thermal expansion material of the cross member (4) by way of a layer (14) of resilient material able to absorb the expansion of the rail (18).

13. A machine tool as in claim 11, comprising at least a second linear motor (19) composed of a stator (20) mounted to the cross member (4), extending parallel to the rail (18), and a magnet (21) associated with each shoe (17) of the carriage (6).

14. A machine tool as in claim 13, wherein the stator (20) is interfaced with the low thermal expansion material of the cross member (4) by way of a layer (14) of resilient material able to absorb the expansion of the stator (20).

15. A machine tool as in claim 10, wherein the carriage (6) is embodied in a low thermal expansion material.

16. A machine tool as in claim 10, wherein the carriage (6) comprises a lattice structure.

17. A machine tool as in claim 10, wherein the machining head (5) is supported by a body (7) mounted to the carriage (6) and capable of vertical motion relative to the selfsame carriage (6).

18. A machine tool as in claim 1, wherein the low thermal expansion material presents a coefficient of linear thermal expansion (CLTE) less than $3*10^{-6}$ $C.^{-1}$[,preferably between $-1*10^{-6}$ $C.^{-1}$ and $1*10^{-6}$ $C.^{-1}$].

19. A machine tool as set forth in claim 18, wherein the low thermal expansion material presents a coefficient of linear thermal expansion (CLTE) between $-1*10^{-6}$ $C.^{-1}$ and $1*10^{-6}$ $C.^{-1}$.

20. A machine tool as in claim 1, wherein the low thermal expansion material is a composite material containing carbon fiber.

21. A machine tool as in claim 1, wherein the low thermal expansion material is a ceramic material.

22. A machine tool as in claim 1, wherein the low thermal expansion material is a composite material containing silicon carbide or derivatives thereof.

23. A multi-axis machine tool comprising:
a first slide way (2a) and a second slide way (2b) set apart one from the other and extending parallel along a longitudinal axis (X);
a machining station (3) delimited laterally by the slide ways (2a, 2b);
a cross member (4) presenting opposite ends (4a, 4b) each associated slidably with a respective slide way (2a, 2b);
a machining head (5) mounted to the cross member (4) and positionable over the machining station (3);
characterized in that the cross member (4), at least, is embodied in a low thermal expansion material (LTEM);
wherein the cross member (4) is equipped with at least two shoes (9) mounted one to each end (4a, 4b) and coupled each with a rail (10) presented by the respective slide way (2a, 2b), wherein each shoe (9) is made of metallic material and interfaced with the low thermal expansion material of the cross member (4) by way of a layer (14) of resilient material able to absorb the expansion of the shoe (9).

24. A multi-axis machine tool comprising:
a first slide way (2a) and a second slide way (2b) set apart one from the other and extending parallel along a longitudinal axis (X);
a machining station (3) delimited laterally by the slide ways (2a, 2b);
a cross member (4) presenting opposite ends (4a, 4b) each associated slidably with a respective slide way (2a, 2b);
a machining head (5) mounted to the cross member (4) and positionable over the machining station (3);
a carriage (6) mounted slidably to the cross member (4), wherein the machining head (5) is mounted to the carriage (6), wherein the carriage (6) is equipped with at least one shoe (17) coupled with a rail (18) installed on the cross member (4);
characterized in that the cross member (4), at least, is embodied in a low thermal expansion material (LTEM); and
wherein the rail (18) is made of metallic material and interfaced with the low thermal expansion material of the cross member (4) by way of a layer (14) of resilient material able to absorb the expansion of the rail (18).

25. A multi-axis machine tool comprising:
a first slide way (2a) and a second slide way (2b) set apart one from the other and extending parallel along a longitudinal axis (X);
a machining station (3) delimited laterally by the slide ways (2a, 2b);
a cross member (4) presenting opposite ends (4a, 4b) each associated slidably with a respective slide way (2a, 2b);
a machining head (5) mounted to the cross member (4) and positionable over the machining station (3);
a carriage (6) mounted slidably to the cross member (4), wherein the machining head (5) is mounted to the carriage (6), wherein the carriage (6) is equipped with at least one shoe (17) coupled with a rail (18) installed on the cross member (4);
at least a linear motor (19) composed of a stator (20) mounted to the cross member (4), extending parallel to the rail (18), and a magnet (21) associated with each shoe (17) of the carriage (6);
characterized in that the cross member (4), at least, is embodied in a low thermal expansion material (LTEM); and
wherein the stator (20) is interfaced with the low thermal expansion material of the cross member (4) by way of a layer (14) of resilient material able to absorb the expansion of the stator (20).

* * * * *